(12) United States Patent
Riggins

(10) Patent No.: US 7,373,517 B1
(45) Date of Patent: May 13, 2008

(54) SYSTEM AND METHOD FOR ENCRYPTING AND DECRYPTING FILES

(75) Inventor: Mark D. Riggins, Mercer Island, WA (US)

(73) Assignee: Visto Corporation, Redwood Shores, CA (US)

( * ) Notice: Subject to any disclaimer, the term of this patent is extended or adjusted under 35 U.S.C. 154(b) by 0 days.

(21) Appl. No.: 09/378,226

(22) Filed: Aug. 19, 1999

(51) Int. Cl.
H04L 9/00 (2006.01)
H04L 9/32 (2006.01)
G06F 12/14 (2006.01)

(52) U.S. Cl. ............... 713/184; 713/168; 713/183; 713/193; 726/5; 380/44

(58) Field of Classification Search ........... 713/168, 713/183, 184, 193; 726/5; 380/44
See application file for complete search history.

(56) References Cited

U.S. PATENT DOCUMENTS

| | | | |
|---|---|---|---|
| 4,652,698 A | 3/1987 | Hale et al. ............... 380/24 |
| 4,831,582 A | 5/1989 | Miller et al. ............ 707/104 |
| 4,897,781 A | 1/1990 | Chang et al. ............ 364/200 |
| 5,048,085 A | 9/1991 | Abraham et al. .......... 380/23 |
| 5,218,638 A * | 6/1993 | Matsumoto et al. ....... 380/228 |
| 5,220,603 A | 6/1993 | Parker ..................... 380/21 |
| 5,263,157 A | 11/1993 | Janis ......................... 707/9 |
| 5,388,255 A | 2/1995 | Pytlik et al. |

(Continued)

FOREIGN PATENT DOCUMENTS

CA 2191505 6/1997

(Continued)

OTHER PUBLICATIONS

Young et al, Deniable Password Snatching: On the Possibility of Evasive Electronic Espionage, 1997, IEEE, pp. 224-235.*

(Continued)

*Primary Examiner*—Ayaz Sheikh
*Assistant Examiner*—Aravind K Moorthy
(74) *Attorney, Agent, or Firm*—Oblon, Spivak, McClelland, Maier & Neustadt, P.C.

(57) ABSTRACT

A system and method distribute the task of decryption between a server and a client. To encrypt data, the client generates an encryption/decryption key. Namely, a user interface obtains a password, generally from a user. A hint generator generates a hint. A key generator generates the key based on the password and the hint. In one embodiment, the key generator hashes the password to generate a first secret, hashes the first secret to generate a second secret, hashes the first secret with the hint to generate an intermediate index, and hashes the second secret and the intermediate index to generate the key. An encryption engine can then use the key to encrypt data. The client then sends the encrypted data and possibly the hint for storage on the server. To decrypt the data, the key must be determined. Accordingly, the server knows some information and the user knows some information for decrypting the data. To generate the key, the decrypting client must first obtain rights to retrieve the hint from the server and must obtain the password from the user. Increased level of security is achieved.

30 Claims, 9 Drawing Sheets

U.S. PATENT DOCUMENTS

| | | | |
|---|---|---|---|
| 5,420,927 A | 5/1995 | Micali | 380/23 |
| 5,425,102 A * | 6/1995 | Moy | 380/25 |
| 5,434,918 A | 7/1995 | Kung et al. | 380/25 |
| 5,491,752 A * | 2/1996 | Kaufman et al. | 380/30 |
| 5,495,533 A | 2/1996 | Linehan | 380/21 |
| 5,510,777 A | 4/1996 | Pilc et al. | |
| 5,544,320 A | 8/1996 | Konrad | |
| 5,544,322 A | 8/1996 | Cheng et al. | 395/200.12 |
| 5,572,643 A | 11/1996 | Judson | 395/793 |
| 5,581,749 A | 12/1996 | Hossain et al. | 707/1 |
| 5,588,132 A | 12/1996 | Cardoza | |
| 5,613,012 A | 3/1997 | Hoffman et al. | 382/115 |
| 5,623,601 A | 4/1997 | Vu | 395/187.01 |
| 5,627,658 A | 5/1997 | Connors et al. | 358/407 |
| 5,644,354 A | 7/1997 | Thompson et al. | 348/13 |
| 5,647,002 A | 7/1997 | Brunson | 380/49 |
| 5,657,390 A | 8/1997 | Elgamal et al. | 380/49 |
| 5,666,530 A | 9/1997 | Clark et al. | 395/617 |
| 5,666,553 A | 9/1997 | Crozier | 395/803 |
| 5,675,782 A | 10/1997 | Montague et al. | |
| 5,682,478 A | 10/1997 | Watson et al. | 395/200.12 |
| 5,682,524 A | 10/1997 | Freund et al. | 395/605 |
| 5,684,990 A | 11/1997 | Boothby | 707/203 |
| 5,701,423 A | 12/1997 | Crozier | 395/335 |
| 5,706,427 A | 1/1998 | Tabuki | 395/187.01 |
| 5,706,502 A | 1/1998 | Foley et al. | 395/610 |
| 5,715,403 A | 2/1998 | Stefik | 705/44 |
| 5,721,779 A | 2/1998 | Funk | 380/23 |
| 5,757,916 A | 5/1998 | MacDoran et al. | 380/25 |
| 5,764,902 A | 6/1998 | Rothrock | |
| 5,778,346 A | 7/1998 | Frid-Nielsen et al. | 395/208 |
| 5,784,463 A | 7/1998 | Chen et al. | 380/21 |
| 5,784,464 A | 7/1998 | Akiyama et al. | 380/25 |
| 5,787,172 A | 7/1998 | Arnold | 380/21 |
| 5,799,086 A | 8/1998 | Sudia | 380/23 |
| 5,812,773 A | 9/1998 | Norin | |
| 5,818,935 A | 10/1998 | Maa | |
| 5,828,840 A | 10/1998 | Cowan et al. | 395/200.33 |
| 5,835,601 A | 11/1998 | Shimbo et al. | |
| 5,862,346 A | 1/1999 | Kley et al. | |
| 5,870,544 A | 2/1999 | Curtis | 395/187.01 |
| 5,924,103 A | 7/1999 | Ahmed et al. | |
| 5,943,676 A | 8/1999 | Boothby | |
| 5,951,652 A | 9/1999 | Ingrassia et al. | 709/248 |
| 5,974,238 A | 10/1999 | Chase, Jr. | |
| 5,982,898 A | 11/1999 | Hsu | 380/23 |
| 5,999,947 A | 12/1999 | Zollinger et al. | 707/203 |
| 6,020,885 A | 2/2000 | Honda | |
| 6,154,844 A * | 11/2000 | Touboul et al. | 713/201 |
| 6,212,529 B1 | 4/2001 | Boothby et al. | |
| 6,343,313 B1 | 1/2002 | Salesky et al. | |
| 6,360,322 B1 * | 3/2002 | Grawrock | 713/176 |
| 6,470,454 B1 * | 10/2002 | Challener et al. | 713/202 |

FOREIGN PATENT DOCUMENTS

| | | |
|---|---|---|
| CA | 2210763 | 1/1999 |
| EP | 0801478 | 10/1997 |
| WO | WO 01/44916 A2 * | 6/2001 |
| WO | WO 2006/123899 A1 * | 11/2006 |

OTHER PUBLICATIONS

Abel, Amee, E-mail anywhere, May 1998, Time, pp. 1-4.*

Kohl, John T., et al.; "The Evolution of the *Kerberos* Authentication Service"; 1991; pp. 1-15; This paper is a revision of a paper presented at the Spring 1991 EurOpen Conference in Tromso, Norway.

Adams, Charlotte; "Multilevel Secure Networking Charges Ahead"; Federal Computer Week; Apr. 12, 1993; 5 pages.

Jaeger, Trent and Atul Prakash; "Implementation of a Discretionary Access Control Model for Script-based Systems"; IEEEE Jun. 1995; 15 pages.

Freier et al., entitled "The SSL Protocol, Version 3.0," Netscape Communications, dated Nov. 18, 1996, pp. 1-59, Downloaded from URL=http://www.home.netscape.com/eng/ssl3/draft302.txt.

Article by Bellovin et al., entitled: "Network Firewalls" Published by IEEE Communications Magazine Sep. 1994, pp. 50-57.

Article by Steffen Stempel, entitled: "IPAccess-An Internet Service Access System for Firewall Installations" Published by IEEE Communications Magazine Feb. 16, 1995, pp. 31-41.

Article by Braun et al., entitled: "Web Traffic Characterization: an assessment of the impact of caching documents from NCSA's web server" Published by Elsevier Science B.V. 1995 pp. 37-51.

Article by Nelson et al., entitled: "Security for Infinite Networks" Published by IEEE Communications Magazine on Aug. 22, 1995, pp. 11-19.

Article by Greenwald et al., entitled: "Designing an Academic Firewall: Policy, Practice, and Experience with SURF" Published by IEEE Communications Magazine on Feb. 22, 1996, pp. 79-92.

Article by Kiuchi et al., entitled: "C-HTTP—The Development of a Secure, Closed HTTP-based Network on the Internet" Published by IEEE Proceedings of SNDSS on Feb. 22, 1996, pp. 64-75.

Article by S. Cobb, entitled: "Establishing Firewall Policy" Published by National Computer Security Assn. on Jun. 25-27, 1996, pp. 198-205.

Mark R. Brown et al. "Using Netscape 2", Second Edition, QUE Corporation, 1995, Chapter 34 "SUN's JAVA and the Netscape Browser", pp. 885-907.

Tanenbaum, Andrew S., "Computer Network", Third Edition, Prentice-Hall 1996, ISBN 0-13-349945-6, Chapter 7, Sections 7.1.4 to 7.1.6, pp. 597-618.

Knudsen, Jonathan, "Java Cryptography", First Edition, O'Reilly & Assoc. 1998, ISBN 1-56592-402-9, pp. 79-91.

Web page: www.verisign.com/press/product/isv.html, Verisign Press Release, "Verisign Enhances Digital IDS to Enable Universal Website Login and One-Step Registration", Nov. 3, 1998, 3 pages.

US 5,373,559, 12/1994, Kaufman et al. (withdrawn)

* cited by examiner (NETWORK SYSTEM)

(CLIENT ENCRYPTION DOWNLOADABLE)

(CLIENT DECRYPTION DOWNLOADABLE)

(SERVER DECRYPTION MODULE)

(ENCRYPTION)

(ENCRYPTION DOWNLOADABLE)

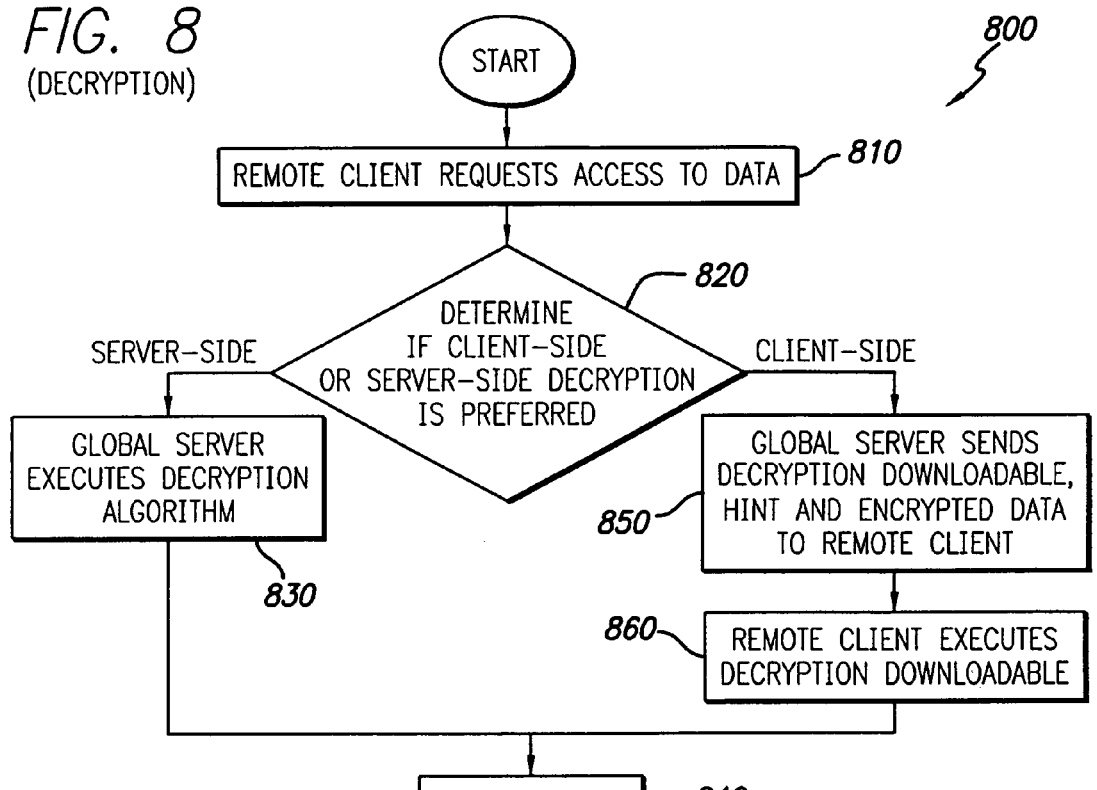
FIG. 8 (DECRYPTION)
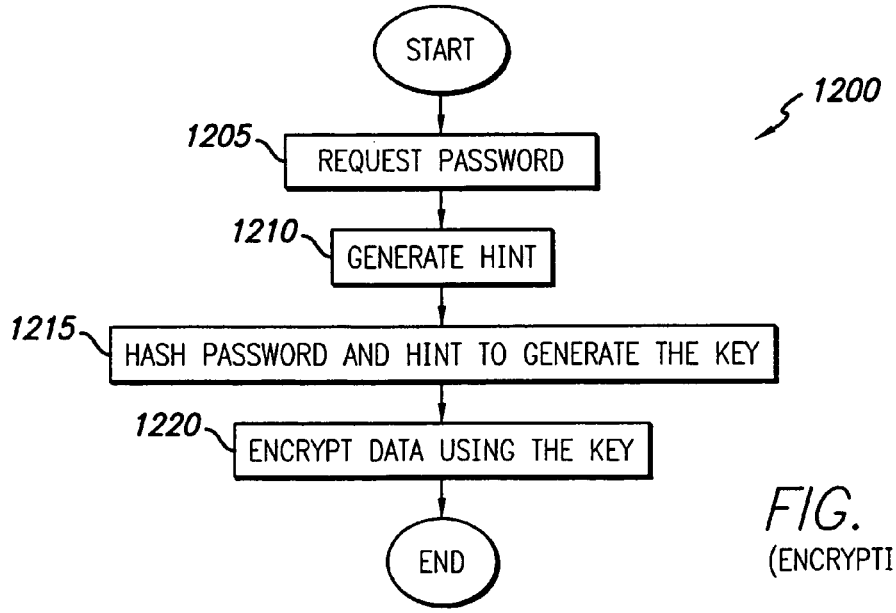
FIG. 12 (ENCRYPTION)

(SERVER DECRYPTION)

(SERVER DECRYPTION DOWNLOADABLE)

(REMOTE CLIENT DECRYPTION DOWNLOADABLE)

SYSTEM AND METHOD FOR ENCRYPTING AND DECRYPTING FILES

BACKGROUND OF THE INVENTION

1. Field of the Invention

This invention relates generally to computer networks, and more particularly to a system and method for encrypting and decrypting files to enable secure exchange of information in a computer network.

2. Background Art

In its infancy, the Internet provided a research-oriented environment where users and hosts were interested in a free and open exchange of information, and where users and hosts mutually trusted one another. However, the Internet has grown drastically, currently interconnecting at least 100,000 computer networks and millions of users. Because of its size and openness, the Internet has become a target of data theft, data alteration and other mischief.

Virtually everyone that sends information over the Internet is vulnerable. Before sending a file, companies balance the benefits and ease of transferring a file over the Internet against the risks of potential unauthorized file access.

One of the most popular of current security techniques is private key file encryption and decryption. A file may be encrypted and decrypted using a private key known to all authorized users. Thus, a file may be encrypted using the private key, forwarded over a computer network, and decrypted using the private key by the end user. Accordingly, both the encrypting party and the decrypting party must know the private key.

This encryption and decryption security technique does not solve problems and concerns of the roaming user. First, for example, a roaming user must maintain a portable record of all private keys so that he or she can decrypt or re-encrypt files. Maintaining a portable record can be a time consuming and cumbersome process. Therefore, a system and method for encrypting and decrypting files is needed to facilitate remote access to information resources in a computer network easily and securely (without sending keys over the network).

SUMMARY OF THE INVENTION

The present invention provides a system and method for encrypting and decrypting files to enable secure access to information resources in a computer network. The system and method distribute the task of decryption between a server and a client, thereby adding to the level of security. The system and method provide recognizable benefits in a network having a trusted client (which performs the encryption), a server (which stores the encrypted data and a hint), and an untrusted client (where the user is currently operating). Decryption may be performed at the server or at the untrusted client, without transferring the key or a password over the network.

To encrypt data, the trusted client generates an encryption/decryption key. That is, a user interface obtains a password, generally from a user. A hint generator generates a hint, preferably, a pseudo-random number. A key generator generates a key based on the password and on the hint. In a more secure, but more complex, embodiment enabling server-side or client-side decryption, the key equals H(H(H(P)), H(H(P), hint)). Namely, a key generator hashes the password to generate a first secret, hashes the first secret to generate a second secret, hashes the first secret with the hint to generate an intermediate index, and hashes the second secret and the intermediate index to generate the key. In a simpler, but less secure, embodiment facilitating client-side decryption, the key equals H(P, hint). Namely, a user interface obtains a password and a hint generator generates a hint. Then, a key generator hashes the password and the hint to generate the key. An encryption engine can then use the key to encrypt data. The client sends the encrypted data and the hint for storage on the server. Alternatively, the global server can generate and store the same hint independently.

To decrypt encrypted data, the key must first be determined. To generate the key, the server knows some information and the user knows some information. For data encrypted using the more secure encryption embodiment, client-side and server-side decryption are each possible.

In the client-side decryption case, a user interface obtains the password from the user. A communications engine retrieves the hint from the server. An index generator hashes the password to generate the first secret, and hashes the hint and the first secret to generate the intermediate index. A key generator hashes the first secret to generate the second secret, and hashes the second secret and the intermediate index to generate the key. In the server-side decryption case, the communications engine forwards the intermediate index to the server. The server, which for this embodiment preferably learned the second secret during account setup, hashes the second secret and the intermediate index to generate the key. It will be appreciated that, because the server does not know the password or the first secret (which is only derivable knowing the password), the server alone cannot compute the key.

For data encrypted using the simpler encryption embodiment, the remote client generates the key. A user interface obtains a password from the user. A communications engine retrieves the hint and encrypted data from the server. A key generator hashes the password and the hint to generate the key. It will be appreciated that any number of hashes can be performed on the variables to compute the key. For example, the password may be hashed to compute a secret, and the secret and key may be hashed to compute the key.

A first system in accordance with the present invention includes a user interface for obtaining a password; a key generator coupled to the user interface for hashing a hint and the password to generate a key; an encryption engine coupled to the key generator for encrypting data using the key; and a communications module coupled to the engine for sending the encrypted data and the hint to a server for storage.

A second system in accordance with the present invention includes an encryption downloadable for deriving an encryption key from a password and a hint; a web server for interfacing with a client, for sending the encryption downloadable to the client, for receiving encrypted data that was encrypted by the encryption downloadable from the client, and for receiving a hint corresponding to the encrypted data and needed to regenerate the key from the client; and memory coupled to the web server for storing the hint and the encrypted data.

A third system in accordance with the present invention includes a user interface for obtaining a password; a communications module for receiving the encrypted data and a hint corresponding to the encrypted from a server; a key generator for hashing the password and the hint to generate a key for decrypting the encrypted data.

A fourth system in accordance with the present invention includes a decryption downloadable for deriving a key from a password and a hint; encrypted data; a hint corresponding to the encrypted data; and a web server for interfacing with a client, and for sending the decryption downloadable, the encrypted data and the hint to the client.

A fifth system in accordance with the present invention includes a user interface for obtaining a password; an index generator coupled to the user interface for generating an intermediate index from a hint received from a server and a secret derived from the password; and a communications engine coupled to the index generator for sending the intermediate index to the server.

A sixth system in accordance with the present invention includes a second secret corresponding to a user; a decryption downloadable for generating an intermediate index from a password and a hint; a web server for receiving an indication of encrypted data to be decrypted, for transmitting the decryption downloadable and a hint corresponding to the indication to a client, and for receiving an intermediate index from the client; and a server-resident module for deriving a key for decrypting the encrypted data from the second secret and the intermediate index.

One of ordinary skill will recognize that the key is never transmitted over computer network. It will be further appreciated that the password is never transmitted over the internet. Thus, even if a hacker somehow obtained the password, the hacker could not generate the key without obtaining the proper hash functions and hint corresponding to the data from the server (which requires proper identification and authentication). It will be further appreciated that, for server-side decryption in the more secure embodiment, the second secret is transmitted only once across the network, preferably, at account setup. The second secret, along with the first secret and the hint, are needed at a later time to generate the key. Thus, it would be practically impossible for a hacker to obtain all the information needed to generate the key.

It will be even further appreciated that, by distributing parts of the decryption function to the remote client and parts to the server, it is not possible for either site alone to decrypt data without acquiring additional information from the other site. One of ordinary skill will understand that by distributing the decryption function between the remote client and server (referred to as double indirection), it is not possible for the global server to decrypt the file without acquiring additional information from the remote client and vice versa. Hence, one of ordinary skill will understand that an unauthorized capture of information during network transfer will fail to provide enough information to decrypt encrypted data. Therefore, the system and method provide a heightened level of data security.

BRIEF DESCRIPTION OF THE DRAWINGS

FIG. 8 is a flowchart illustrating a method of decrypting a file in accordance with the present invention;

FIG. 12 is a flowchart illustrating another method of encrypting data; and

DETAILED DESCRIPTION

The following description illustrates general and specific principles of the invention and is not to be considered limiting.

Figure 1:
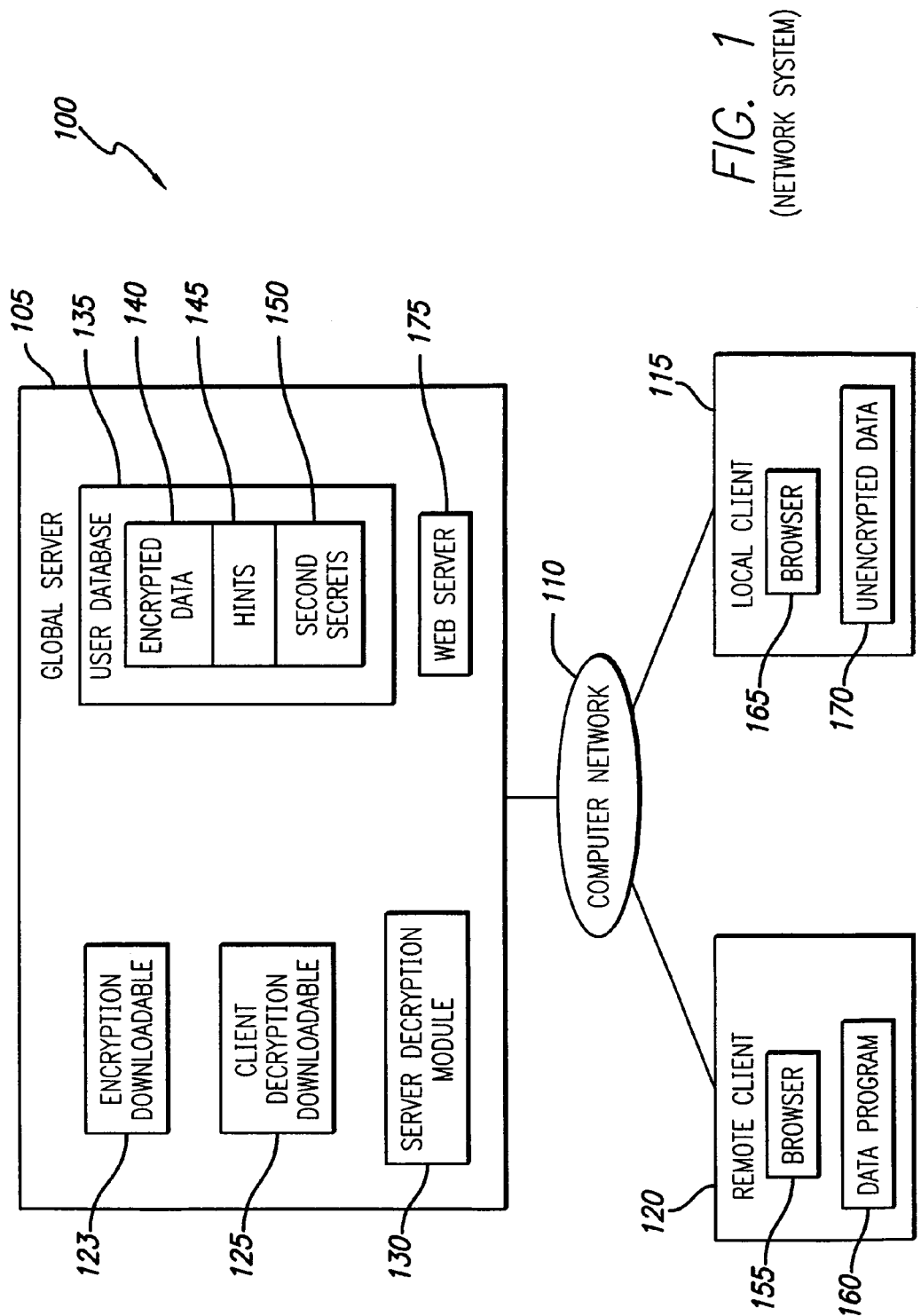
FIG. 1 is a block diagram illustrating a roaming-user network access system in accordance with the present invention.

FIG. 1 is a block diagram illustrating an exemplary network system 100 for encrypting and decrypting data, in accordance with the present invention. Network system 100 comprises a global server 105 coupled via computer network 110 to a local client 115 and to a remote client 120. The computer network 110 may include or be a part of the wide area network commonly referred to as the Internet. The global server 105 may be protected by a global firewall (not shown), and the local client 115 and remote client 120 may each be protected by a client firewall (not shown).

The global server 105 includes a computer system that has an encryption downloadable 123, a client decryption downloadable 125, a server decryption module 130, a user database 135 and a web server 175. The user database 135 includes encrypted data 140, hints 145 and second secrets 150. It will be appreciated that global server 105 may also include security services (not shown) for performing identification and authentication services to confirm user access privileges.

For the invention herein, a Downloadable is executable or interpretable application code, which is downloaded from a source computer and run on a destination computer. Further, the term "executable" includes "interpretable." A Downloadable is typically requested and executed by an ongoing process such as by an Internet browser or web client. Examples of Downloadables include Java™ applets designed for use in the Java™ distributing environment developed by Sun Microsystems, Inc., JavaScript™ scripts also developed by Sun Microsystems, Inc., ActiveX™ controls designed for use in the ActiveX™ distributing environment developed by the Microsoft Corporation, Visual Basic also developed by the Microsoft Corporation and HTML. Downloadables may also include plugins, which add to the functionality of an already existing application program. It will be appreciated that each Downloadable may include one or more applets, one or more ActiveX controls, one or more plugins, etc. or combinations thereof. Although preferable, it will be further appreciated that the Downloadable need not be deleted upon logoff.

The local client 115 includes a computer system that has a browser 165 and unencrypted data 170. The remote client 120 includes a computer system that has a browser 155 and a data program 160 for viewing the unencrypted (or decrypted) data 170. The local client 115 may be a "trusted" client, and the remote client 120 may be an "untrusted" client. It will be appreciated that the difference between the remote client 120 and the local client 115 is merely that the user operates the local client 115 to encrypt data 170 and the user operates the remote client 120 to request decryption of the data 140. The remote client 120 and local client 115 may be the same computer. The term "browser" is being used herein to include any engine for communicating in a network environment, possibly using File Transfer Protocol (FTP), HyperText Transfer Protocol (HTTP) and HyperText Markup Language (HTML). It will be appreciated that local client 115 or remote client 120 may include a smart telephone, a Personal Data Assistant (PDA) such as the Palm III™ system by the U.S. Robotics, Inc., a laptop computer, etc. Although not shown, one skilled in the art will recognize that the local client 115 may also include an instance of the data program 160. Those skilled in the art will recognize that the data program 160 may be a data processing program, an e-mail program, a network browser, a calendar program or another type of processing engine. Accordingly, the unencrypted data 170 may include files, e-mail, bookmarks, calendar information or other type of data.

The encryption downloadable 123 enables the local client 115 to encrypt the unencrypted data 170 and to store the encrypted data 140 on the global server 105. A first method of encryption is discussed with reference to FIGS. 6 and 7. Generally, the encryption downloadable 123 generates two secrets from a password and selects a random number hint 145. The encryption downloadable 123 then hashes the hint and the first secret to generate an intermediate index. The encryption downloadable 123 then hashes the index and the second secret to generate the key, which is used to encrypt the data 170. The encryption downloadable 123 then sends the encrypted data 140 and the hint 145 to the global server 105. Alternatively, the encryption downloadable 123 can send the encrypted data 140 to the global server 105, and the global server 105 can generate and store the same hint 145 independently. It will be appreciated that a hash function provides a non-reversible calculation of result that prevents derivation of the original values. It will be appreciated that an embodiment where the server generates the hint, computes the key from the secrets and encrypts the data is also possible, and easily understood by one skilled in the art from the teachings herein. It will be further appreciated that file encryption could be performed by the global server 105. For example, the unencrypted data 170 could be uploaded to the global server 105 via a secure transmission line and encrypted at the global server 105.

Accordingly, to decrypt the encrypted data 140, the hint 145 and two secrets associated with the encrypted data 140 must be determined. To enable client-side decryption of encrypted data 140, the encryption downloadable 123 stores the hint 145 on the global server 105. To enable server-side decryption of the encrypted data 140, the encryption downloadable 123 stores the hint 145 and the second secret 150 on the global server 115. These two methods of decryption are described with reference to FIGS. 8-11.

Other techniques of encryption and decryption, which allow a client site 115/120 to maintain some information and the server 105 to maintain other information for decrypting data 140, are also possible in light of the teachings herein. For example, in a simpler but less secure embodiment that facilitates client-side decryption (described in greater detail with reference to FIGS. 12 and 13), the key equals H(P, hint). Generally, a key generator hashes a password and a hint to generate the key. The hint is stored on the global server and the password is known by the user. Accordingly, for decryption, two-site responsibility is still needed to generate the key.

The client decryption downloadable 125 performs client-side decryption, and is described with reference to FIGS. 8 and 11. Generally, the client decryption downloadable 125 requests the password from the user on the remote client 120 and uses the same hashing function to generate the two secrets. Using the secrets and the hint (downloaded from the global server 105), the decryption downloadable 125 uses the same hashing algorithm as the encryption downloadable 123 to generate the same key. The decryption downloadable 125 then uses the key to decrypt the encrypted file 140.

The server decryption module 130 performs server-side decryption, and is described with reference to FIGS. 8-10. Generally, the server decryption module 130 sends a downloadable (server decryption downloadable 505, FIG. 5) and the hint 145 associated with the encrypted file 140 to the client 120. The decryption downloadable 505 is described in detail with reference to FIG. 5. The downloadable requests the password from the user and uses the same hashing algorithm as the encryption downloadable to generate the first secret. The downloadable then uses the first secret and the hint 123 in the same hashing algorithm as the encryption downloadable to generate the intermediate index. The downloadable then sends the index to the server decryption module 130, which uses the intermediate index and the second secret 150 to generate the key.

It will be appreciated that the second secret may have been stored on the global server 105 during the setup of the original account. That is, at account setup, a downloadable having secret generation code may have been sent to the user, for example, at the local client 115, who inputs a password. The downloadable then generates the second secret 150 and forwards the second secret 150 to the global server 105. It will be appreciated that the second secret 150 alone is not enough to generate the key, since the intermediate index is not known. It will be appreciated that, for this embodiment, server-side or client-side decryption could be selected based on the security level of the communication channel between the client 120 and server 105, on client terminal type (e.g., processor power), on the size of the file (e.g., the length of time it will take to download the file), or on user preferences. Further, server-side or client-side decryption can be determined at the time of decryption, at the time of encryption, at account setup, or at any other time.

The web server 114 provides web page data and web page functionality to clients, such as to the remote client 116 or to the local client 124. Providing web page functionality and data may include transmitting downloadables such as the encryption downloadable 123 and the client decryption downloadable 125 to the clients.

Figure 2:
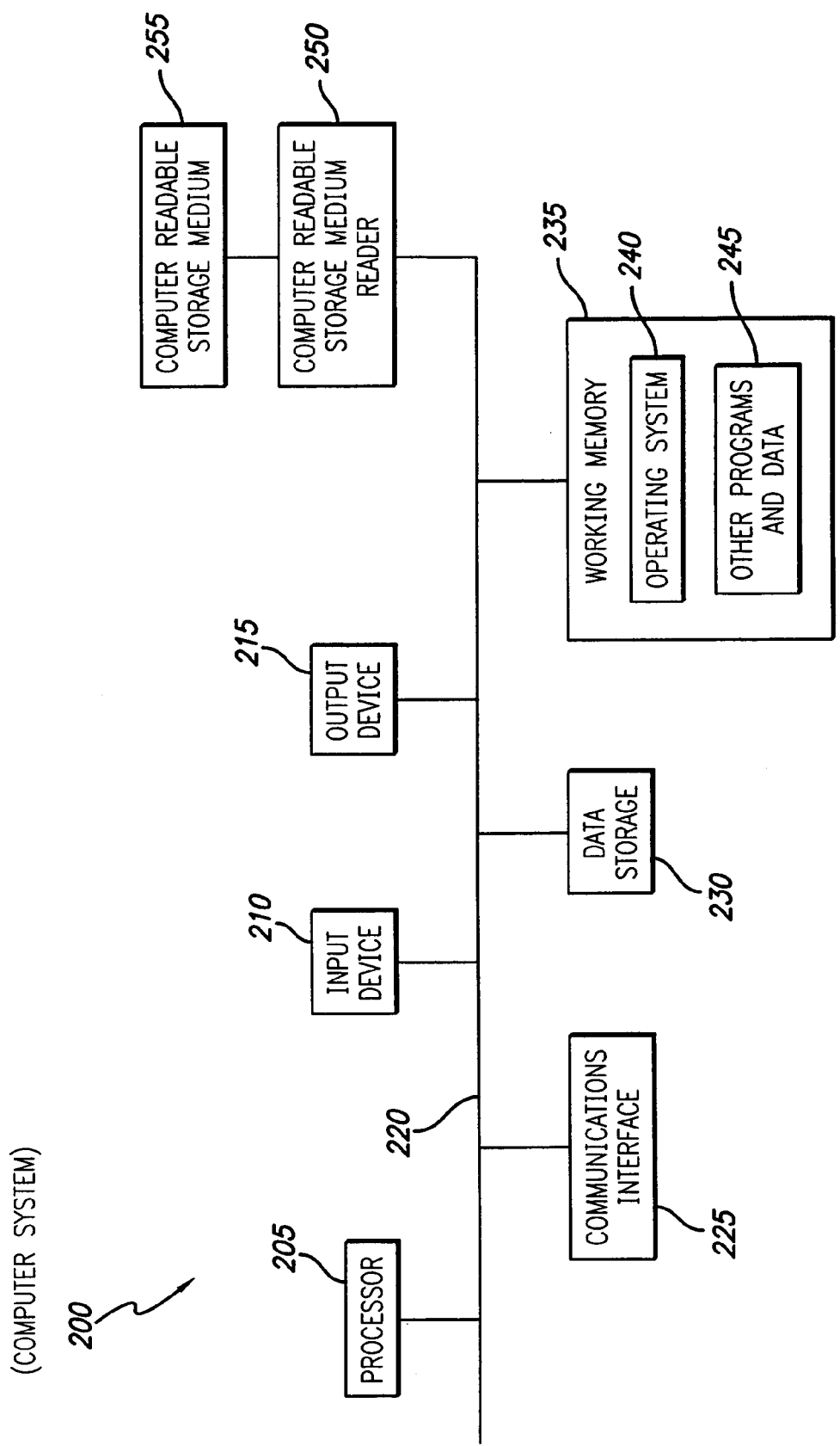
FIG. 2 is a block diagram illustrating details of an example computer.

FIG. 2 is a block diagram illustrating a computer system 200 which illustrates details of each of the global server 105, the local client 115 and the remote client 120. The computer system 200 includes a processor 205, such as an Intel Pentium® microprocessor or a Motorola Power PC® microprocessor, coupled to a communications channel 220. The computer system 200 further includes an input device 210 such as a keyboard and mouse, an output device 215 such as a Cathode Ray Tube (CRT) display, a communications device 225, data storage 230 such as a magnetic disk, and working memory 235 such as Random-Access Memory (RAM), each coupled to the communications channel 220. The communications channel 220 may be coupled to a computer network 110. One skilled in the art will recognize that, although the data storage 230 and working memory 235 are illustrated as separate units, data storage 230 and working memory can be integrated or partially integrated units.

An operating system 240 controls processing by the processor 205, and is typically stored in data storage 230 and loaded into working memory 235 (as illustrated) for execution. Other programs and data 245 such as browsers, servers, downloadables, unencrypted or encrypted data, etc. may also be stored in data storage 230 and loaded into working memory 235 (as illustrated) for execution by processor 205.

One skilled in the art will recognize that the computer system 200 may also include additional information, such as network connections, additional memory, additional processors, LANs, input/output lines for transferring information across a hardware channel, the Internet or an Intranet, etc. One skilled in the art will also recognize that the programs and data may be received by and stored in the system in alternative ways. For example, a computer-readable storage medium (CRSM) reader 250 such as a floppy disk drive, hard disk drive, CD-ROM reader, magneto-optical reader, CPU (for RAM), etc. may be coupled to the communications channel 220 for reading a computer-readable storage medium (CRSM) 255 such as a magnetic disk, a hard disk, a magneto-optical disk, RAM, etc. Accordingly, the computer system 200 may receive programs and data via the CRSM reader 250.

Figure 3:
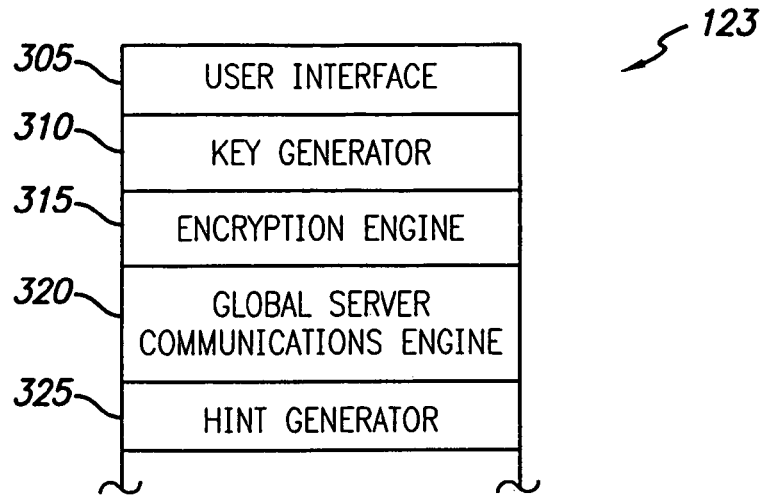
FIG. 3 is a block diagram illustrating details of the encryption downloadable of FIG. 1.

FIG. 3 is a block diagram illustrating details of the encryption downloadable 123. The encryption downloadable 123 includes a user interface 305, a key generator 310, an encryption engine 315, a global server communications engine 320 and a hint generator 325. The user interface 305 includes code for causing a computer to present information to and request information from the user. For example, the user interface 305 requests identification and authentication information, and a password and identification of the unencrypted data 170 desired to be encrypted. The key generator 310 includes code for generating a key for encrypting data 170. As described above, the key generator 310 performs an algorithm of generating first and second secrets from a password, hashing the first secret and the hint 145 to generate an intermediate index, and hashing the second secret and the intermediate index to generate the key. During the key generation process, the key generator 310 requests the hint generator 325 to generate a random number, preferably of variable length, to be the hint 145. The encryption engine 315 includes code for using the key and an encryption algorithm, e.g., symmetric algorithms, DES, triple DES, BlowFish, RC-5, etc., to encrypt the unencrypted file 170. The global server communications engine 320 includes any code needed for communicating with the global server 105, e.g., for sending the hint 145 and the encrypted file 140 and, if necessary, the second secret 150, to the global server 105. It will be appreciated that the global server 105 may include a hint generator (not shown) to generate the same hint as generated by the hint generator 325. Accordingly, the local client 115 need not forward the hint to the global server 105. A method of encrypting data is described in detail with reference to FIGS. 6 and 7.

It will be appreciated that, for client-side decryption, the system may alternatively not generate a secret at all. Alternatively, the system may perform any number of hashes of the variable password and variable hint. For example, the key generator 310 may hash the password and the hint to generate the key. When a request is received for client-side decryption, the client decryption downloadable and hint may be transmitted to the remote client 120. The client decryption downloadable can request the password, and hash the hint and password to generate the key. A hacker obtaining the transmitted hint has insufficient information to generate the key. Two secrets are generated for server-side decryption since the hint and intermediate index must be transmitted across the network 110. A second level of indirection is therefore needed. In either case, the task of decryption is distributed between the global server 105 and remote client 120, and the key is never transmitted across the network 110.

Figure 4:
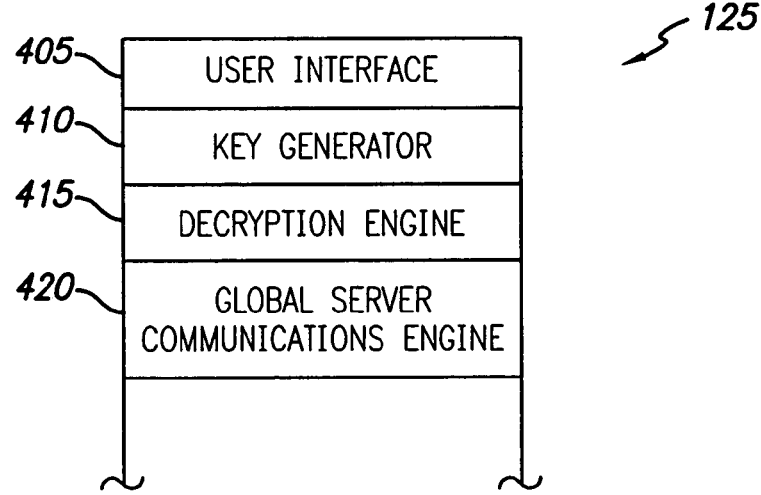
FIG. 4 is a block diagram illustrating details of the client decryption downloadable of FIG. 1.

FIG. 4 is a block diagram illustrating details of the client decryption downloadable 125. The client decryption downloadable 125 includes a user interface 405, a key generator 410, a decryption engine 415 and a global server communications engine 420. The user interface 405 is similar to the user interface of the encryption downloadable 123, and includes code needed for causing a computer to present information and request information from a user. For example, the user interface 405 requests identification and authentication information, a password and identification of the encrypted data 140 to be decrypted. The key generator 410 includes code for generating the key using the same algorithm as the key generator 310 of the encryption downloadable 123. That is, preferably, the key generator 410 uses the password to generate the first and second secrets, hashes the hint and first secret to generate the intermediate index, and hashes the second secret and the intermediate index to generate the key. Lastly, the decryption engine 415 includes code for using the key and a decryption algorithm, e.g., symmetric algorithms, DES, triple DES, BlowFish, RC-5, etc., which is associated with the encryption algorithm used by the encryption engine 315 of the encryption downloadable 123, to decrypt the encrypted data 140. The global server communications engine 420 includes any code needed to communicate with the global server 105 to receive hints 145 and encrypted data 140. A method of decryption is described in detail with reference to FIGS. 8-11.

Figure 5:
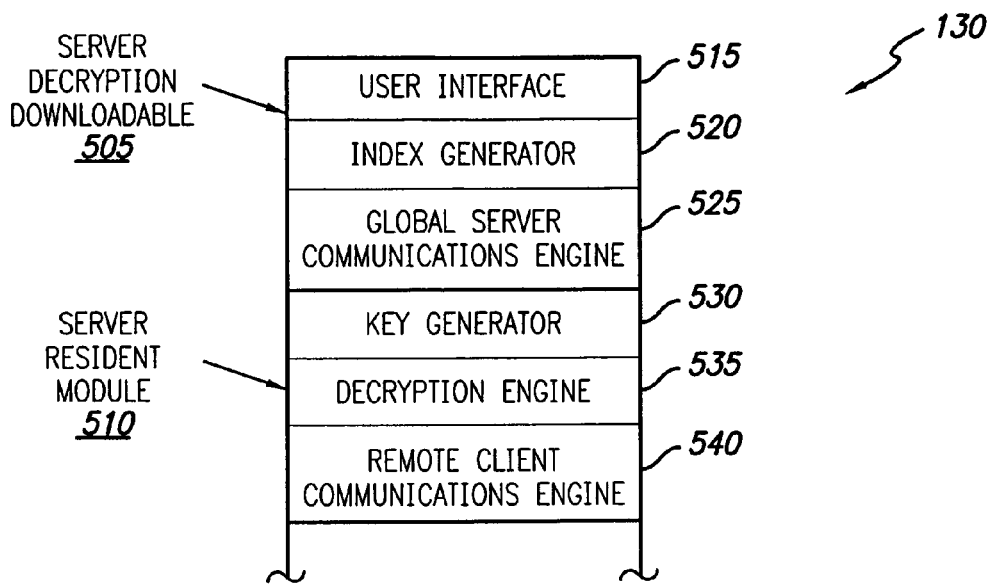
FIG. 5 is a block diagram illustrating details of the server decryption module of FIG. 1.

FIG. 5 is a block diagram illustrating details of the server decryption module 130. The server decryption module 130 includes a server decryption downloadable 505 and a server resident module 510. The server decryption downloadable 505 includes a user interface 515, an index generator 520 and a global server communications engine 525. The server resident module 510 includes a key generator 530, a decryption engine 535 and a remote client communications engine 540. The user interface 525 is similar to the user interface 305 of the encryption downloadable 123 and to the user interface 405 of the client decryption downloadable 125. The user interface 515 includes code for presenting information to and requesting information from the user, such as identification and authentication information, a password and identification of encrypted data 140 to be decrypted. The index generator 520 preferably includes code for using the password to generate the first secret, and for hashing the first secret and the hint to generate the intermediate index. The global server communications engine 525 includes code for communicating with the global server 105, e.g., for receiving hints 145 and decrypted data from the global server 105 and sending the intermediate index to the global server 105.

The key generator 530 preferably includes code for hashing the intermediate index and the second secret 150 previously stored on the global server 105 to generate the key. It will be appreciated that the second secret 150 may have been received at account creation, during a previous transaction or, if necessary, during this transaction. The decryption engine 535 is similar to the decryption engine 415 of the client decryption downloadable 125, and includes code for using the key and the decryption algorithm associated with the encryption algorithm performed by the encryption engine 315 to decrypt the encrypted data 140. The remote client communications engine 540 includes any necessary code for sending the decrypted data to the remote client 120, if so requested.

Figure 6:
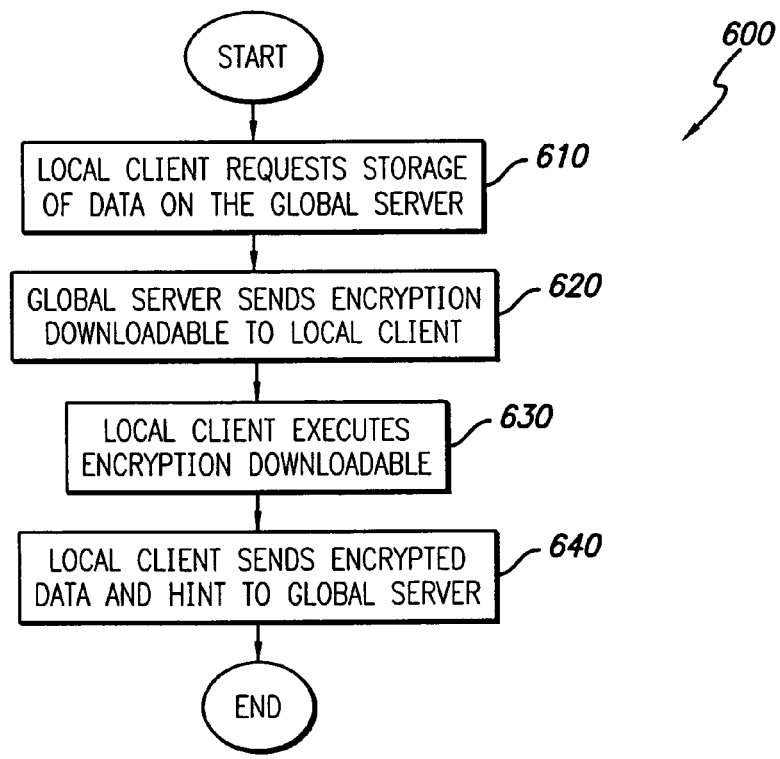
FIG. 6 is a flowchart illustrating a method of file encryption in accordance with the present invention.

FIG. 6 is a flowchart illustrating a method 600 of encrypting data 170 in network system 100. Method 500 begins by the local client 115 in step 610 requesting storage of data 170 on the global server 105. Step 610 may include contacting the global server 105 by its URL and selecting the data storage option from its web page. The web server 175 presenting the web page may further request identification of the data 170 on the local client 115 to be encrypted and stored. The global server 105 in step 620 sends the encryption downloadable 123 to the local client 115. Alternatively, the encryption downloadable 123 may be a permanently installed component, stored on the local client 115 via, for example, a floppy drive or an internet link.

The local client 115 in step 630 executes the encryption downloadable 123, possibly using the applet-enabled browser 165, installation software initiated automatically, ActiveX™ controls, etc., to encrypt data 170. Details of step 630 are described with reference to FIG. 7. The local client 115 in step 640 sends the encrypted data 140 and the hint 145 corresponding to the encrypted data 140 to the global server 105. It will be appreciated that, for global server decryption, the local client 115 in step 640 may also send the second secret 150 associated with the user's password to the global server 105. However, preferably, the second secret 150 has been previously stored on the global server 105 before initiation of this current request, such as at account setup. Method 600 then ends.

Figure 7:
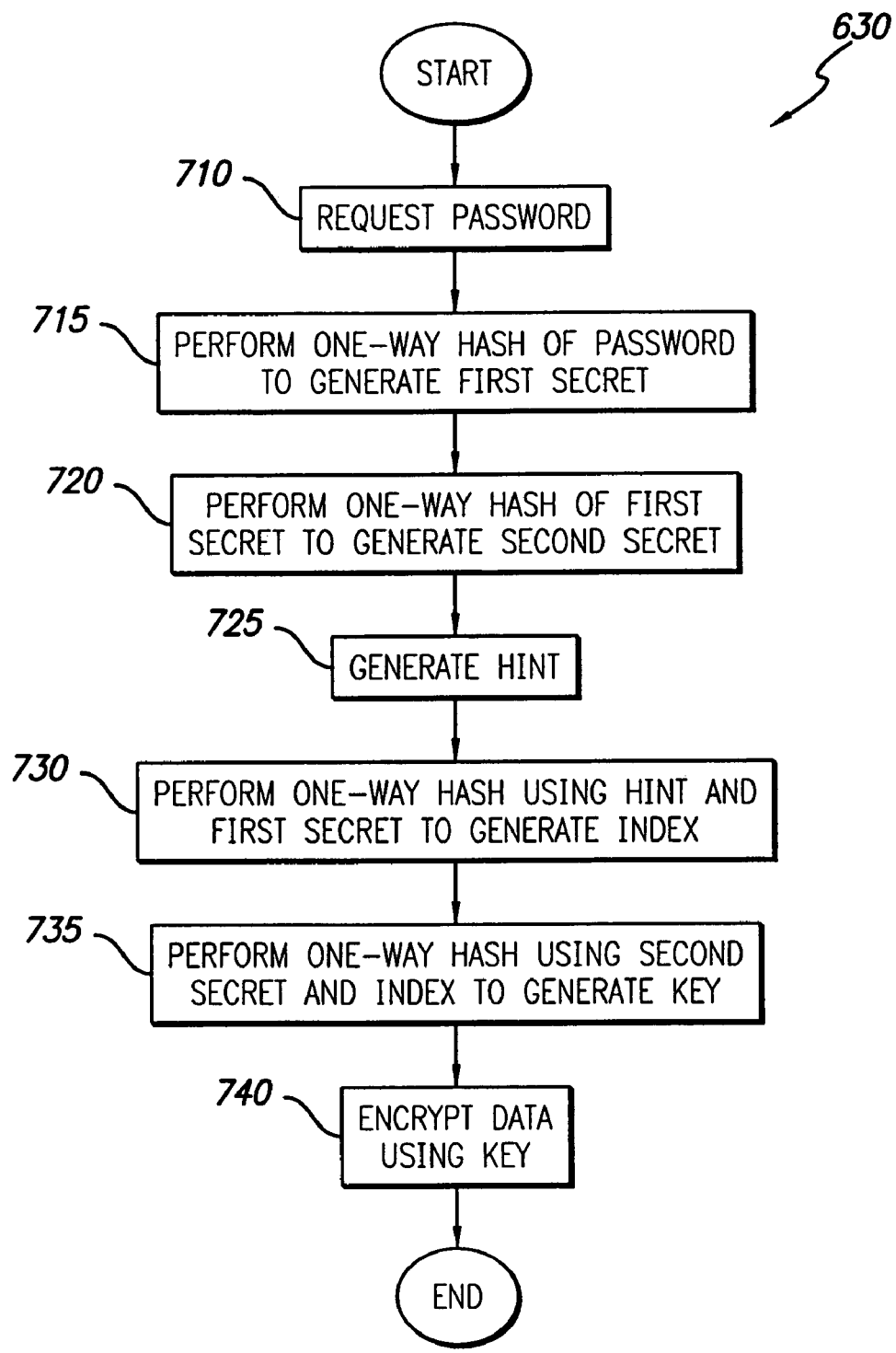
FIG. 7 is a flowchart illustrating details of key generation and use in accordance with FIG. 6.

FIG. 7 is a flowchart illustrating details of step 630 as a method 700 of encrypting data 170. Method 700 begins with the user interface 305 of the encryption downloadable 123 in step 710 requesting the password from the user or, alternatively, from another computer or subroutine. It will be appreciated that the password chosen will not be transmitted over the computer network 110, thereby increasing the level of security. The key generator 310 of the encryption downloadable 123 in step 715 performs a one-way hash of the password to generate a first secret, and in step 720 performs a one-way hash of the first secret to generate a second secret 150. It will be appreciated that any two secrets can be used, however, two nested hashes of a password provides the best mode known for generating secrets and minimizing the data needed by a user. One of ordinary skill in the art will understand that each one way hash function provides a non-reversible calculation that prevents derivation of the original password or input value or values.

The key generator 310 of the encryption downloadable 123 in step 725 instructs the hint generator 325 to generate a hint. The hint generator 325 generates a cryptographically semi-random number, preferably of variable length, and forwards the number to the key generator 310 as the hint. The key generator 310 in step 730 performs a one-way hash using the hint and the first secret to generate an intermediate index. The key generator 310 in step 735 performs a one-way hash function using the intermediate index and the second secret to generate the key. Accordingly, the encryption engine 315 in step 740 encrypts the unencrypted data using the key. Method 630 then ends.

FIG. 8 is a flowchart illustrating a method 800 of decrypting encrypted data 140, in accordance with the present invention. Method 800 begins with the browser 155 on the remote client 120 in step 810 requesting access to the encrypted data 140. It will be appreciated that remote client 116 may only request a portion of encrypted data 140. In step 820, a determination is made whether to perform client-side or server-side decryption. This determination is preferably made by the original user setting a preference at account setup or at the time the encrypted data 140 being requested was placed on the global server 105.

If server-side decryption is selected, then the global server 105 in step 830 executes the decryption algorithm, described in greater detail with reference to FIGS. 9 and 10. Method 800 then proceeds to step 840. If client-side decryption was selected, then the global server 105 in step 850 sends the client decryption downloadable 125, hint 145 and encrypted data to the remote client 120. The browser 155 in step 860 executes the client decryption downloadable 125. Method 800 then proceeds to step 840.

Then, in step 840, the remote client 120 can, for example, access the decrypted data. In another example, the remote client 120 in step 840 can attach the data to an e-mail and transmit the e-mail to another person. In yet another example, the remote client 120 in step 840 can encrypt the data using another person's key, attach the data to an e-mail and transmit the e-mail to another person. It will be appreciated that, in either case where an e-mail is being sent, the global server 105 need not download the decrypted data since the remote client 120 merely transmitting the e-mail and data to another person. The global server 105 can perform these steps on behalf of the remote client 120. Method 800 then ends.

Figure 9:
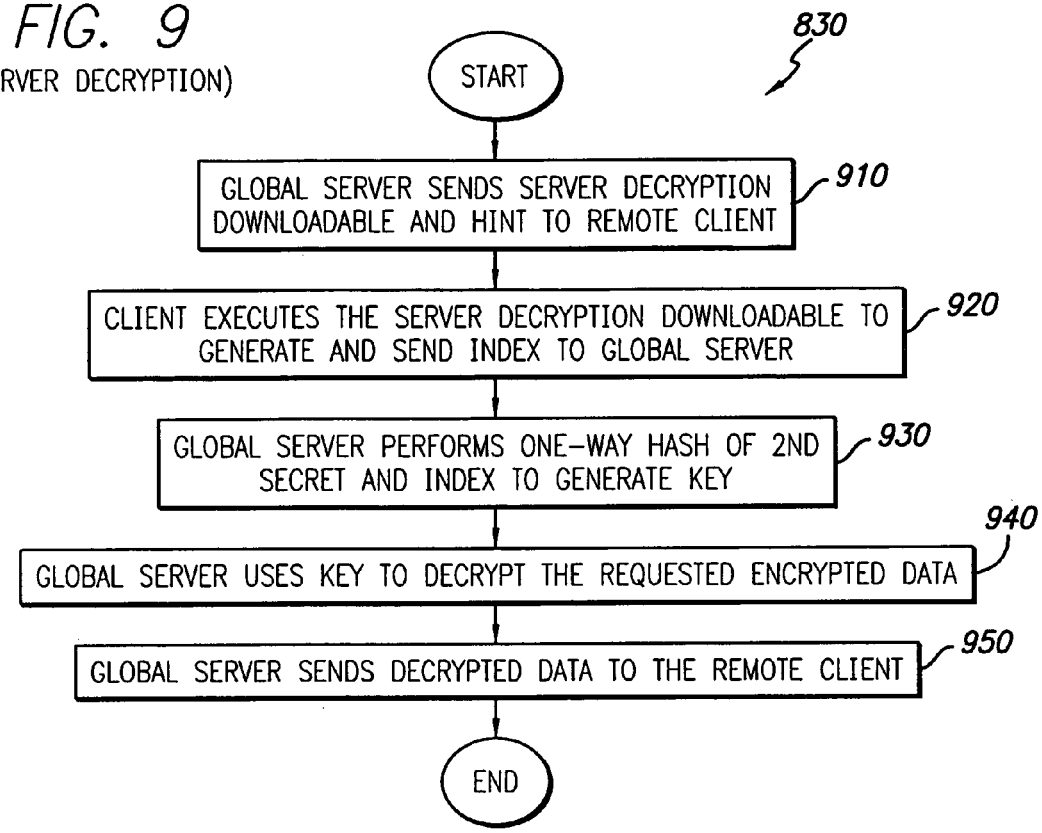
FIG. 9 is a flowchart illustrating details of server decryption in accordance with FIG. 8.

FIG. 9 is a flowchart illustrating step 830 in greater detail as a method 830 of server decryption. Method 830 begins with the global server 105 in step 910 sending to the remote client 120 the server decryption downloadable 505 and hint 145 corresponding to the data selected. The remote client 120 in step 920 executes the server decryption downloadable 505 to generate and send the intermediate index to the global server 105, described in greater detail with reference to FIG. 10. The key generator 530 of the server resident module 510 on the global server 105 in step 930 performs a one-way hash function of the second secret 150 corresponding to the user of the remote client 120 and the intermediate index to generate the key. It will be appreciated that step 930 may include multiple hashes of the second secret, hints and index to generate the key. In the preferred embodiment, step 930 is more than concatenation of the second secret and intermediate index. Step 930 may conform to PKCS standards or HMAC standards. The decryption engine 535 of the server resident module 510 on the global server 105 in step 940 uses the key to decrypt the requested encrypted data 140. In step 950, the global server 105 can, for example, send the decrypted data to the remote client 120 or alternatively enable the remote client 120 to perform some action on or manipulation of the decrypted data. Method 830 then ends.

Figure 10:
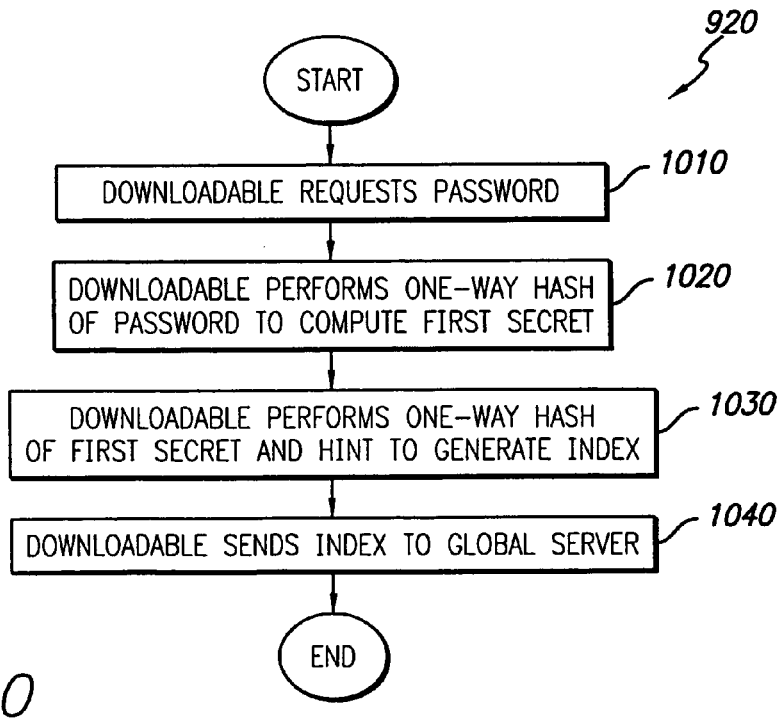
FIG. 10 is a flowchart illustrating additional details of server decryption in accordance with FIG. 9.

FIG. 10 is a flowchart illustrating step 920 in greater detail, as a method 920. Method 920 begins with the index generator 520 of the server decryption downloadable 505 in step 1010 requesting the password from the user of the remote client 120. The index generator 520 in step 1020 performs a one-way hash function of the password to compute the first secret, and in step 1030 performs a one-way hash function of the first secret and hint 145 to generate the intermediate index. The global server communications engine 525 of the server decryption downloadable 505 sends the index to the remote client communications engine 540 of the server resident module 510 on the global server 105. Method 920 then ends.

Figure 11:
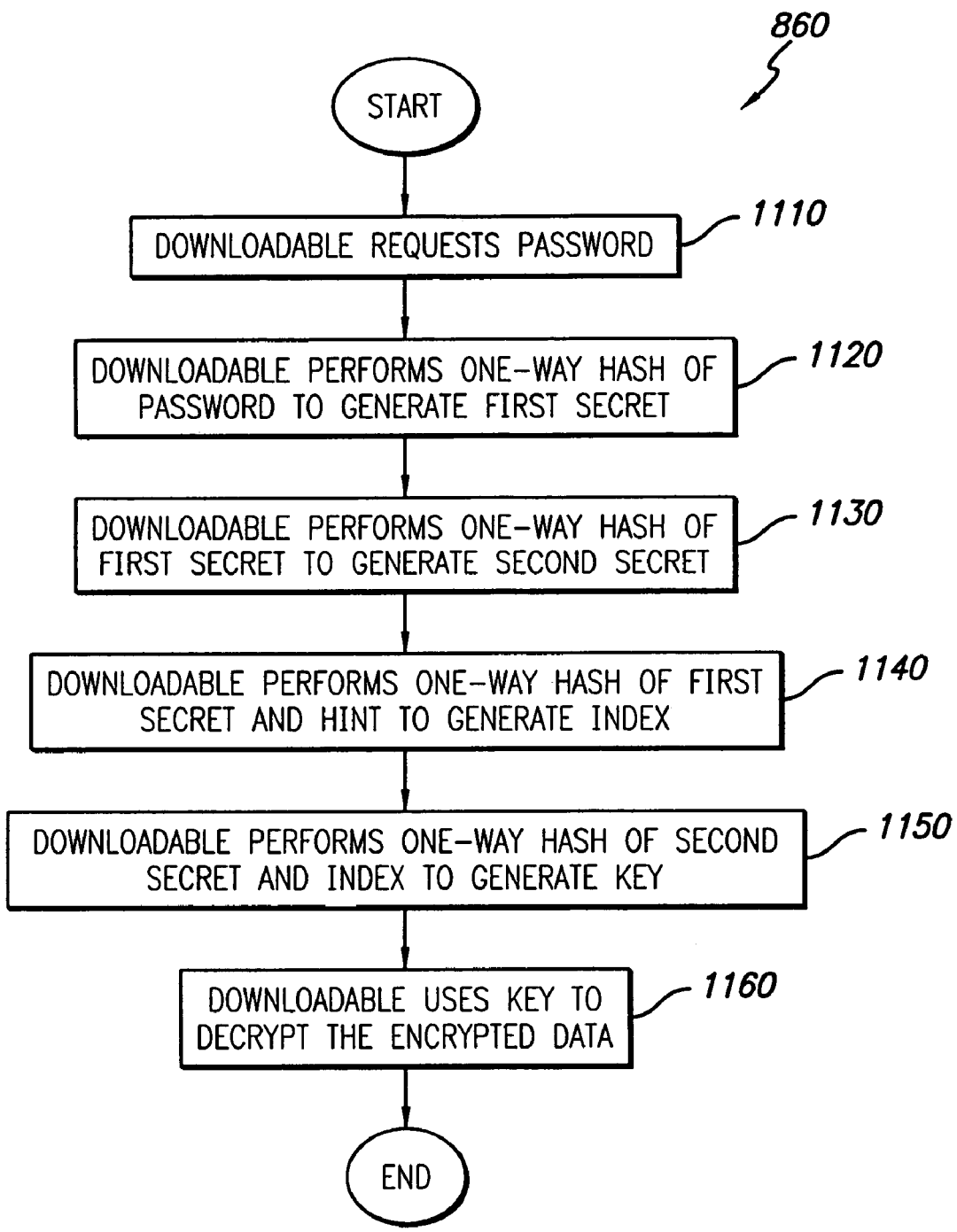
FIG. 11 is a flowchart illustrating details of remote client decryption in accordance with FIG. 8.

FIG. 11 is a flowchart illustrating step 860 in greater detail, as a method 860. Method 860 begins the key generator 405 of the client decryption downloadable 125 in step 1110 requesting the password from the user of the remote client 120. The key generator 405 in step 1120 performs a one-way hash function of the password to generate the first secret, and in step 1130 performs a one-way hash function of the first secret to generate the second secret. The key generator 410 in step 1140 performs a one-way hash function of the first secret and the hint 145 to generate the intermediate index, and in step 1150 performs a one-way hash function of the second secret and the intermediate index to generate the key. The decryption engine 415 of the client decryption downloadable 125 in step 1160 uses the key to decrypt the encrypted data 140. Method 860 then ends.

One of ordinary skill will recognize that the key is never transmitted over computer network. It will be further appreciated that the password is never transmitted over the internet. Accordingly, the key cannot be generated. Even if a hacker somehow obtained the password, the key could not be generated without obtaining the proper hash functions and hint corresponding to the data from the global server 105 (which requires proper identification and authentication). It will be further appreciated that the second secret 150 is transmitted only once across the network 110, and needed at the time the data is to be decrypted.

It will be even further appreciated that, by distributing parts of the decryption function to the remote client 120 and parts to the global server 105, it is not possible for either site alone to decrypt data without acquiring additional information from the other site. One of ordinary skill will understand that by distributing the decryption function between the remote client and global server (referred to as double indirection), it is not possible for the global server to decrypt the file without acquiring additional information from the remote client. Hence, one of ordinary skill will understand that an unauthorized capture of information during network transfer will fail to provide enough information to decrypt encrypted data 140. Therefore, the system and method provide a heightened level of data security.

FIG. 12 is a flowchart illustrating a simple encryption method 1200, in accordance with the present invention. Method 1200 begins with the user interface 305 in step 1205 requesting a password. The hint generator 325 in step 1210 generates a hint. The key generator 310 in step 1215 hashes the hint and the password to generate the key. The encryption engine 315 in step 1220 uses the key to encrypt data. Method 1200 then ends.

Figure 13:
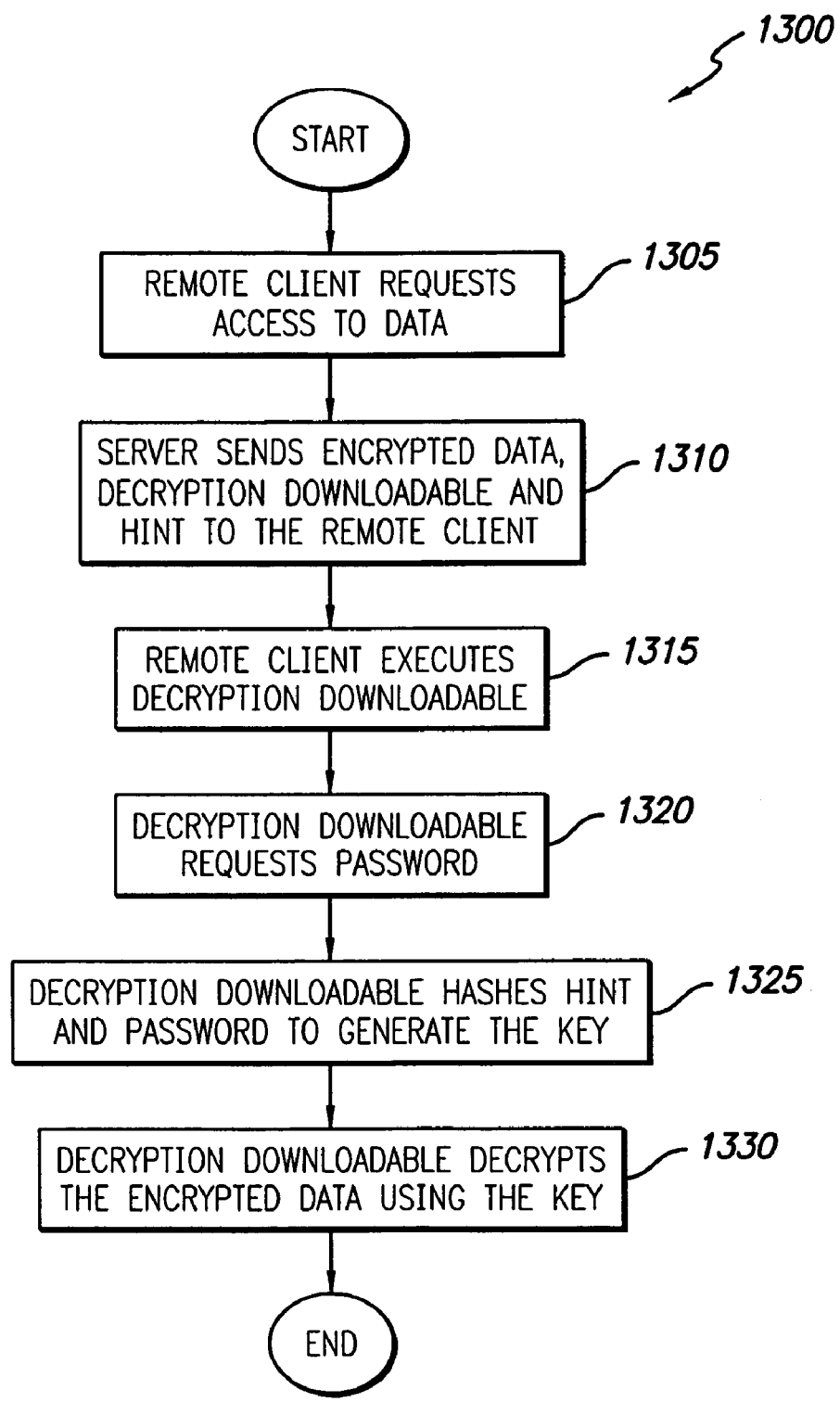
FIG. 13 is a flowchart illustrating another method of decrypting data.

FIG. 13 is a flowchart illustrating a simple decryption method 1300 for decrypting data encrypted using encryption method 1200. Method 1300 begins with the remote client 120 in step 1305 requesting access to encrypted data 140 stored on the server 105. The server 105 in step 1310 sends the encrypted data 140, the corresponding hint 145 and at least a portion of the client decryption downloadable 125 to the remote client 120. The remote client 120 in step 1315 executes the decryption downloadable 125. The user interface 405 in step 1320 requests the password from the user. The key generator 410 in step 1325 hashes the password and the hint to generate the key. The decryption engine 415 in step 1330 uses the key to decrypt the encrypted data 140. Method 1300 then ends.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method for storing and enabling access to data at a server, the method comprising:
   receiving a hint at the server from a first device, the hint generated by executable code located on the first device;
   receiving, at the server, data encrypted by using a key, the key generated by performing a hashing algorithm on the hint and a password; and
   sending the hint to a second device.

2. The method of claim 1, wherein the step of performing a hashing algorithm includes hashing the password.

3. A method for storing and enabling access to data at a server, the method comprising:
   receiving a hint at the server from a first device, the hint generated by executable code located on the first device; and
   receiving, at the server, data encrypted by using a key, the key generated by performing a hashing algorithm on the hint and a password, wherein
   performing the hashing algorithm includes hashing the password to derive a first secret, hashing the first secret to derive a second secret, hashing the hint and the first secret to generate an intermediate index, and hashing the intermediate index and the second secret to generate the key.

4. A system, comprising:
   a user interface configured to obtain a password;
   a key generator coupled to the user interface configured to perform a hashing algorithm on a hint and the password to generate a key;
   an encryption engine coupled to the key generator configured to encrypt data stored on a device using the key;
   a communications module coupled to the encryption engine configured to send the encrypted data and the hint to a server for storage.

5. The system of claim 4, further comprising:
   a hint generator configured to generate the hint.

6. The system of claim 4, wherein the key generator hashes the password.

7. A system, comprising:
   a user interface configured to obtain a password;
   a key generator coupled to the user interface configured to perform a hashing algorithm on a hint and the password to generate a key wherein the key generator hashes the password to derive a first secret, hashes the first secret to derive a second secret, hashes the hint and the first secret to generate an intermediate index, and hashes the intermediate index and the second secret to generate the key;
   an encryption engine coupled to the key generator configured to encrypt data stored on a device using the key; and
   a communications module coupled to the engine configured to send the encrypted data to a server for storage.

8. A system, comprising:
   means for obtaining a hint;
   means for obtaining a password through an interface to executable code transmitted to a device;
   means for performing a hashing algorithm on the hint and the password to generate a key;

means for encrypting data stored on the device using the key; and means for sending the encrypted data to a server for storage.

9. The system of claim 8, wherein the executable code is stored on a computer-readable storage medium.

10. The system of claim 8, wherein the system is configured to transmit the executable code embodied in a carrier wave.

11. A method for storing and enabling access to data at a server, the method comprising:

receiving, at the server, a request to store encrypted data from a device;

sending an encryption downloadable to the device for deriving a key to encrypt data stored at the device;

receiving, at the server, encrypted data encrypted by the encryption downloadable from the device;

receiving, from the device, a hint, corresponding to the encrypted data and used for regenerating the key; and storing the hint and the encrypted data at the server.

12. A system, comprising:

an encryption downloadable configured to derive an encryption key from a password and a hint;

a web server configured to interface with a device and send the encryption downloadable to the device, and receive data encrypted by the encryption downloadable from the device; and a memory coupled to the web server configured to store a hint corresponding to the encrypted data and used to regenerate the key from the device and the encrypted data.

13. A method, comprising;

receiving, at a device, encrypted data and a hint corresponding to the encrypted data from a server;

inputting a password through an interface to executable code; and performing a hashing algorithm on the password and the hint at the device to generate a key for decrypting the encrypted data.

14. The method of claim 13, wherein performing the hashing algorithm further includes hashing the password.

15. A system, comprising:

a user interface configured to obtain a password;

a communication module configured to send encrypted data and a hint corresponding to the encrypted data from a server to a device; and a key generator for performing a hashing algorithm on the password and the hint at the device to generate a key for decrypting the encrypted data.

16. A system, comprising:

means for obtaining a password through an interface to executable code transmitted to a device;

means for sending encrypted data and a hint corresponding to the encrypted data from a server to the device; and means for performing a hashing algorithm on the password and the hint at the device to generate a key for decrypting the encrypted data.

17. The system of claim 16, wherein the executable code is stored on a computer-readable storage medium.

18. The system of claim 16, wherein the system is configured to transmit the executable code embodied in a carrier wave.

19. A method, comprising:

receiving information identifying encrypted data stored at a server;

sending a decryption downloadable to a device, the decryption downloadable deriving a key from a password and a hint;

sending the hint corresponding to the encrypted data to the device; and deriving the key by hashing at least one of the hint and the password.

20. A system, comprising:

a decryption downloadable configured to derive a key by hashing at least one of a password and a hint corresponding to encrypted data;

a memory configured to store the encrypted data and the hint corresponding to the encrypted data; and a web server configured to interface with the device, and send the decryption downloadable, the encrypted data, and the hint to the client.

21. A device based method, comprising:

obtaining a password through an interface to executable code transmitted to the device;

deriving a first secret from the password;

receiving a hint corresponding to data to be decrypted from a server;

deriving an intermediate index from the first secret and the hint; and sending the intermediate index to the server, the intermediate index used to decrypt data stored on the server.

22. The method of claim 21, wherein deriving the first secret further includes hashing the password.

23. The method of claim 21, wherein deriving an intermediate index further includes hashing the first secret and the hint.

24. A system, comprising:

a user interface configured to obtain a password;

an index generator coupled to the user interface configured to generate an intermediate index from a hint received from a server and a secret derived from the password; and a communications engine coupled to the index generator configured to send the intermediate index to the server.

25. The system of claim 24, wherein the index generator is further configured to generate the intermediate index by hashing the hint and the secret.

26. A system, comprising;

means for obtaining a password through an interface to executable code transmitted to a device;

means for deriving a first secret from the password;

means for receiving a hint corresponding to data to be decrypted from a server;

means for deriving an intermediate index from the first secret and the hint; and means for sending the intermediate index to the server, the intermediate index used to decrypt data stored at the server.

27. The system of claim 26, wherein the executable code is stored on a computer-readable storage medium.

28. The system of claim 26, wherein the system is configured to transmit the executable code embodied in a carrier wave.

29. A server-based method, comprising;

receiving from a device, a request for access to data stored at a server;

transmitting to the device a hint corresponding to the data, and a decryption downloadable for deriving an intermediate index from a password and the hint;

receiving the intermediate index from the device; and deriving a decryption key from a second secret corresponding to the device and the intermediate index.

30. A system, comprising;
- a memory configured to store a second secret corresponding to a device;
- a decryption downloadable configured to generate an intermediate index from a password and a hint corresponding to encrypted data;
- a web server configured to receive information identifying the encrypted data to be decrypted, transmit the decryption downloadable and the hint corresponding to the encrypted data to the device, and receive an intermediate index from the device; and
- a server-resident module configured to derive a key for decrypting the encrypted data from the second secret and the intermediate index.

* * * * *